(12) United States Patent
Zhang et al.

(10) Patent No.: US 8,022,913 B2
(45) Date of Patent: Sep. 20, 2011

(54) INSTANT-ON HEATER

(75) Inventors: Kun Zhang, Austin, TX (US);
Frederick P. Herrmann, Sharon, MA (US)

(73) Assignee: Kopin Corporation, Taunton, MA (US)

( * ) Notice: Subject to any disclaimer, the term of this patent is extended or adjusted under 35 U.S.C. 154(b) by 780 days.

(21) Appl. No.: 11/784,215

(22) Filed: Apr. 5, 2007

(65) Prior Publication Data

US 2007/0236441 A1   Oct. 11, 2007

Related U.S. Application Data

(60) Provisional application No. 60/790,060, filed on Apr. 7, 2006, provisional application No. 60/792,897, filed on Apr. 18, 2006.

(51) Int. Cl.
*G09G 3/36* (2006.01)

(52) U.S. Cl. ............ 345/92; 345/204; 345/101; 349/72; 349/199

(58) Field of Classification Search .................... 345/82, 345/87, 102, 92, 98–101, 204; 349/59, 60, 349/61, 161, 162, 72, 199
See application file for complete search history.

(56) References Cited

U.S. PATENT DOCUMENTS

| | | | | |
|---|---|---|---|---|
| 5,063,378 A | * | 11/1991 | Roach | 345/90 |
| 5,559,614 A | * | 9/1996 | Urbish et al. | 349/21 |
| 6,700,638 B1 | * | 3/2004 | Nousiainen | 349/161 |
| 2006/0139501 A1 | * | 6/2006 | Lee et al. | 349/21 |

OTHER PUBLICATIONS

Notification Concerning Transmittal of International Preliminary Report on Patentability for Application No. PCT/US2007/008513, dated Oct. 16, 2008, 8 pages.

* cited by examiner

*Primary Examiner* — Lun-Yi Lao
*Assistant Examiner* — Olga Merkoulova
(74) *Attorney, Agent, or Firm* — Hamilton, Brook, Smith & Reynolds, P.C.

(57) ABSTRACT

A heater, used in a Liquid Crystal Display (LCD) pixel array that uses a common voltage polysilicon line to supply heat to the pixel elements, instead of using active control transistor input lines, such as gate input lines. The approach permits the display to be activated during the warm-up process.

7 Claims, 8 Drawing Sheets

*Figure 3: Pixel Cross-Section Diagram*

Figure 4. Color pixel layout

INSTANT-ON HEATER

RELATED APPLICATION(S)

This application claims the benefit of U.S. Provisional Application No. 60/790,060, filed on Apr. 7, 2006 and also the benefit of U.S. Provisional Application No. 60/792,897, filed on Apr. 18, 2006. The entire teachings of the above applications are incorporated herein by reference.

BACKGROUND OF THE INVENTION

A typical Liquid Crystal Display (LCD) cannot operate properly at low temperature due to liquid crystal (LC) characteristics. For an LCD to be visible, some type of heating system to warm and maintain a certain temperature is required.

Two approaches to heating and maintain proper LC temperature have been employed in existing LCD technologies. One is an external heater which is attached to the Thin Film Transistor/Indium Tin Oxide TFT/ITO cover glass following display fabrication. This approach provides maintenance heating by conducting current through the LCD cover glass. Because it occupies the inactive area surrounding the active LCD matrix and provides heat along the edges of the LCD and through the cover glass(es), an external heater is generally inefficient and unable to rapidly warm the display during cold start conditions.

Another approach is a row-line heater which is an internal heater integrated into the active matrix architecture of the display. The row line-heater can be used during cold start conditions to rapidly warm the liquid crystal material. The row-line heater is located within pixel array, very close to LC, so that it provides high efficiency, uniform heating inside of LCD glass.

Figure 1:
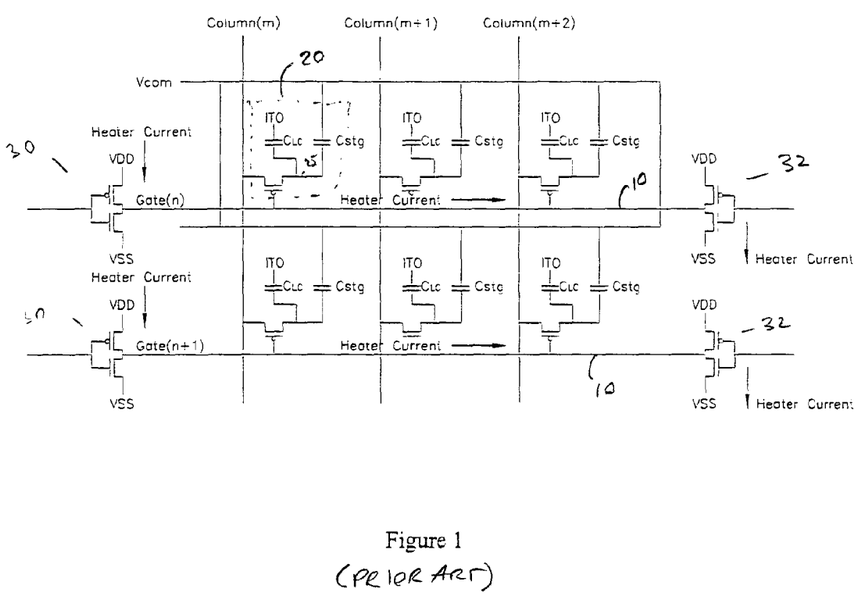
FIG. 1 is a schematic diagram of a display element heater according to the prior art that uses the conductive (polysilicon) row lines that also control the transistor gates to supply heat to the display elements.

FIG. 1 is an example of a row-line heater known in the prior art. This approach uses polysilicon row lines that also control the pixel transistors' input gates. Current can flow through the polysilicon row lines 10 to produce heat close to the pixel elements 20, and hence close to the LC material, but during the heating phase, no image can be shown with this approach, since the row transistors 30 and 32 are saturating the row lines 20 to heat them. $C_{LC}$ is the capacitance between the electrode 25 and an ITO common plate with the liquid crystal in between, and Cstg is the pixel storage capacitance. The warm-up time needed during cold start of the devices limits their usage in various applications of even this design.

SUMMARY OF THE INVENTION

The present invention is an alternative approach that provides rapid heating of LC material even while the display panel is operating. A heater circuit is fabricated along with the display circuit but does not interfere with the operation of the display circuits. In particular, the display heater uses a common voltage conductive line to supply heat to the display panel, instead of active control transistor input lines, such as gate input lines.

No additional or new process steps, beyond those needed to fabricate the LCD itself, are required for fabrication of a heater according to the present invention. The internal heater can eliminate the need for an external heater, resulting in cost and power reductions. Heater operation also does not affect the operation of the display panel, since the heater is now independent of the display controls. It can, therefore, be used for temperature maintenance and control while simultaneously presenting full-rate video imagery.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

In the present invention, a polysilicon heater is fabricated in the display active matrix in such a way that it can provide heat, even during normal (active) display operation. The instant-on heater lines are formed by modifying the polysilicon structures that previously formed the fixed VCOM pixel capacitor electrodes.

Figure 2:
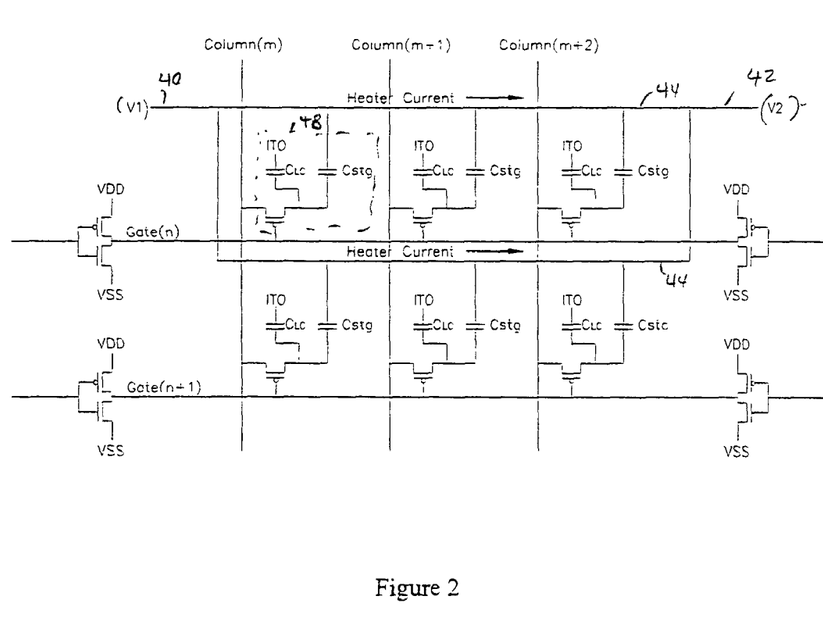
FIG. 2 is a schematic diagram of a display element heater according to one embodiment of the invention that instead uses a common voltage polysilicon line to supply heat to the display elements.

FIG. 2 is a circuit diagram of one embodiment. Here two heater structure terminals, at nodes V1 (40) and V2 (42), are used to control the current through the conductive lines. By controlling the DC voltage between node V1 and node V2, current through the conductive line(s) 44 produces heat rapidly and physically close to the LC structure in the pixel elements 48. Since these conductive lines work as one plate of pixel capacitor which stores AC video signals, the DC voltage on the plate has no effect on the respective pixel 48 voltage. Thus, heat can be provided even while the pixel 48 is in active display mode.

Figure 3:
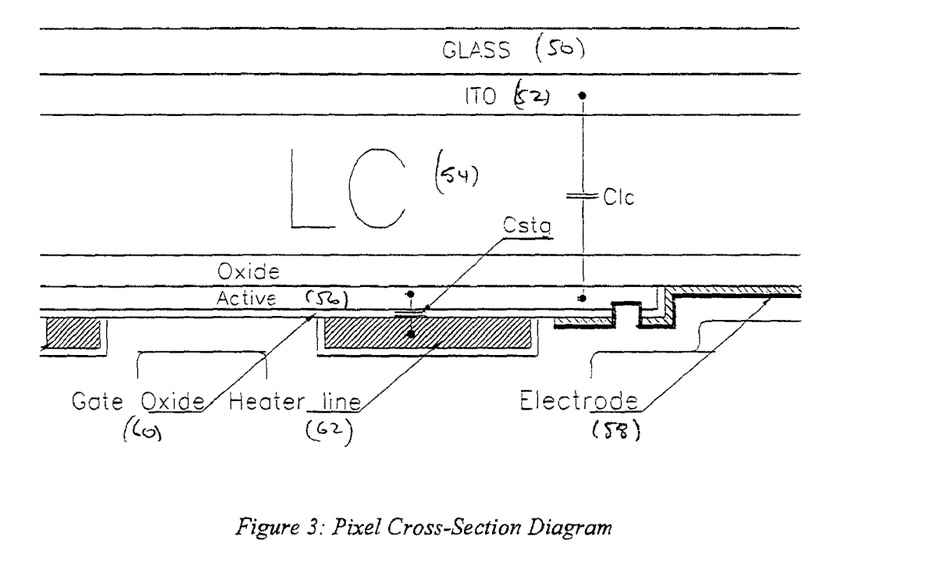
FIG. 3 is a cross sectional diagram of portions of a display element.

On the other hand, the active layer which resides between these heater lines and LC material shields LC from being affected by DC levels. FIG. 3 is a cross sectional view of one of the pixel elements showing this in more detail. As long as the DC voltages on V1 and V2 are not changed dramatically, the LCD can therefore present an image while simultaneously performing temperature warm-up or maintenance.

The heater structure terminals V1 (40) and V2 (42) are preferably brought out external to the display circuits package so that the heater can be controlled separately from the operation of the display circuits.

This approach is attractive because it represents an integrated high efficiency approach that can be operated relatively independent of the display function. A higher heater power can be applied during the cold start for effective warm-up and then be gradually lowered down while to maintain the desired operating temperature.

In one embodiment, the dimensions for various structures shown in FIG. 3 can be glass (50) plus ITO (52) thickness equal to about 0.7 mm; LC (54) about 2.4 um; Active (56) about 320 nm; Electrode (58) about 12 nm; Gate Oxide (60) about 60 nm; and Heater Line (62) about 500 nm. Other configurations are possible, however.

Because it is physically close to the LC material and operates simultaneously with display imaging, the instant-on heater eliminates the shortcomings of the prior art. It also avoids the heat conduction problems of external heaters and minimizes the impacts of physical mounting. The instant-on heater is fabricated during a normal IC process. The heater can be configured to achieve the desired resistance and power independent of the display circuit.

Figure 4:
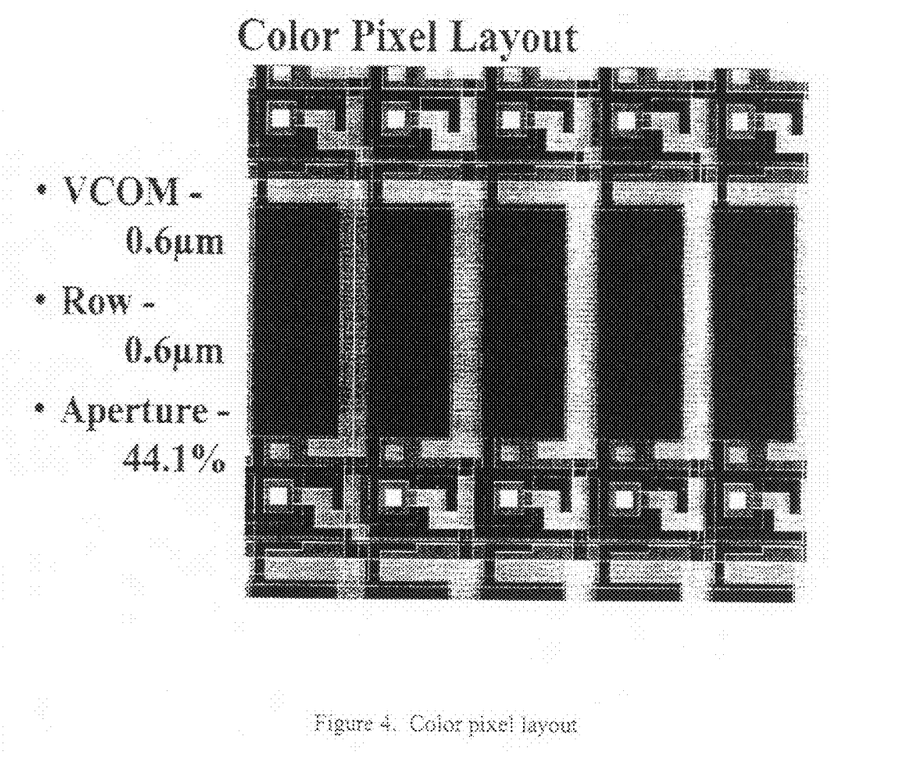
FIG. 4 is a top plan view of a display element array.

FIG. 4 is a plan diagram showing the layout of a color pixel array incorporating the invention.

Figure 5:
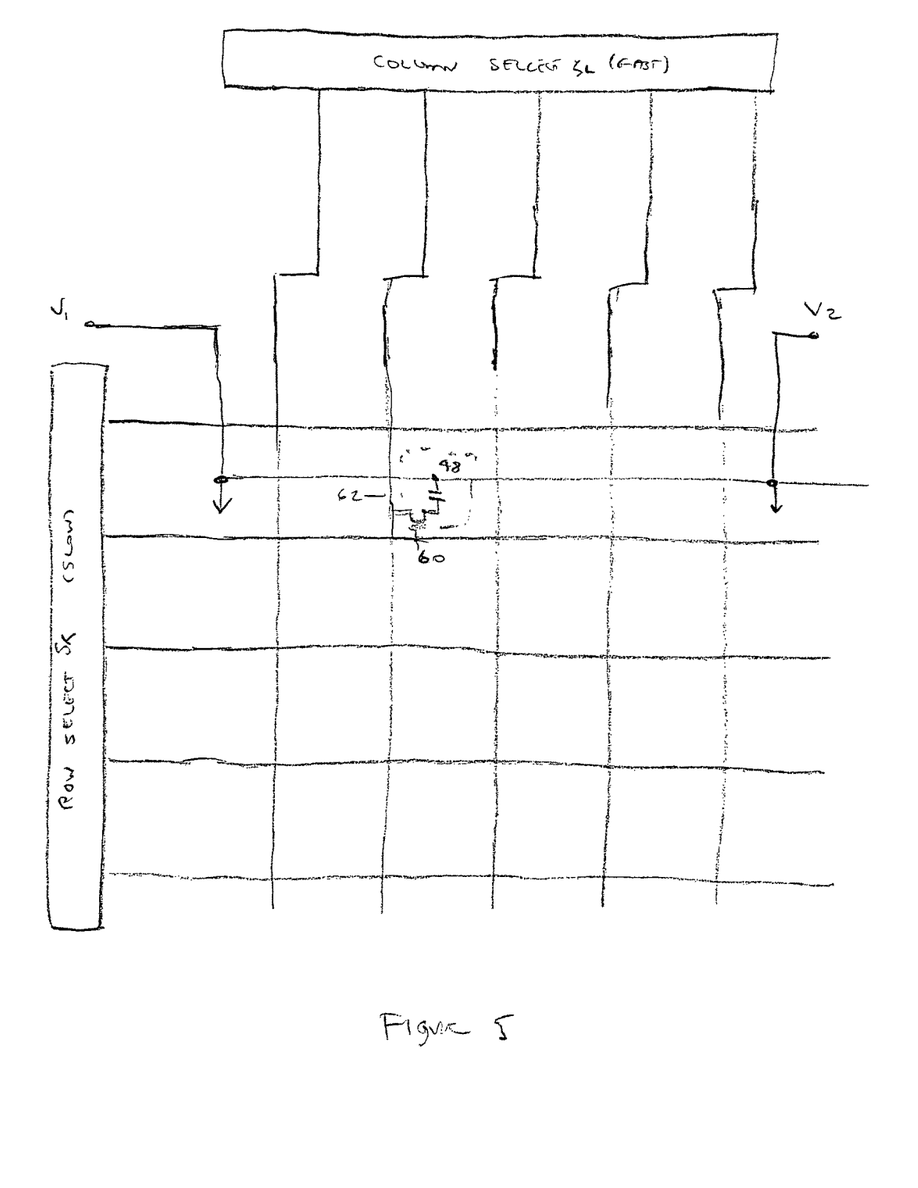
FIG. 5 is a circuit diagram of a display element array which may use the heater.

FIG. 5 is a higher level circuit diagram of a display that my incorporate the heater of FIGS. 2 and 3. As in those figures, nodes V1 and V2 provide heating to pixel elements 48. An example of one of the pixel elements 48 is also seen to be controlled by one of the row select lines 60 and one of the column select lines 62. The row select line 60 and column select line 62 are fed from respective ones of a row select shift register 64 and column select shift register 66.

Figure 6:
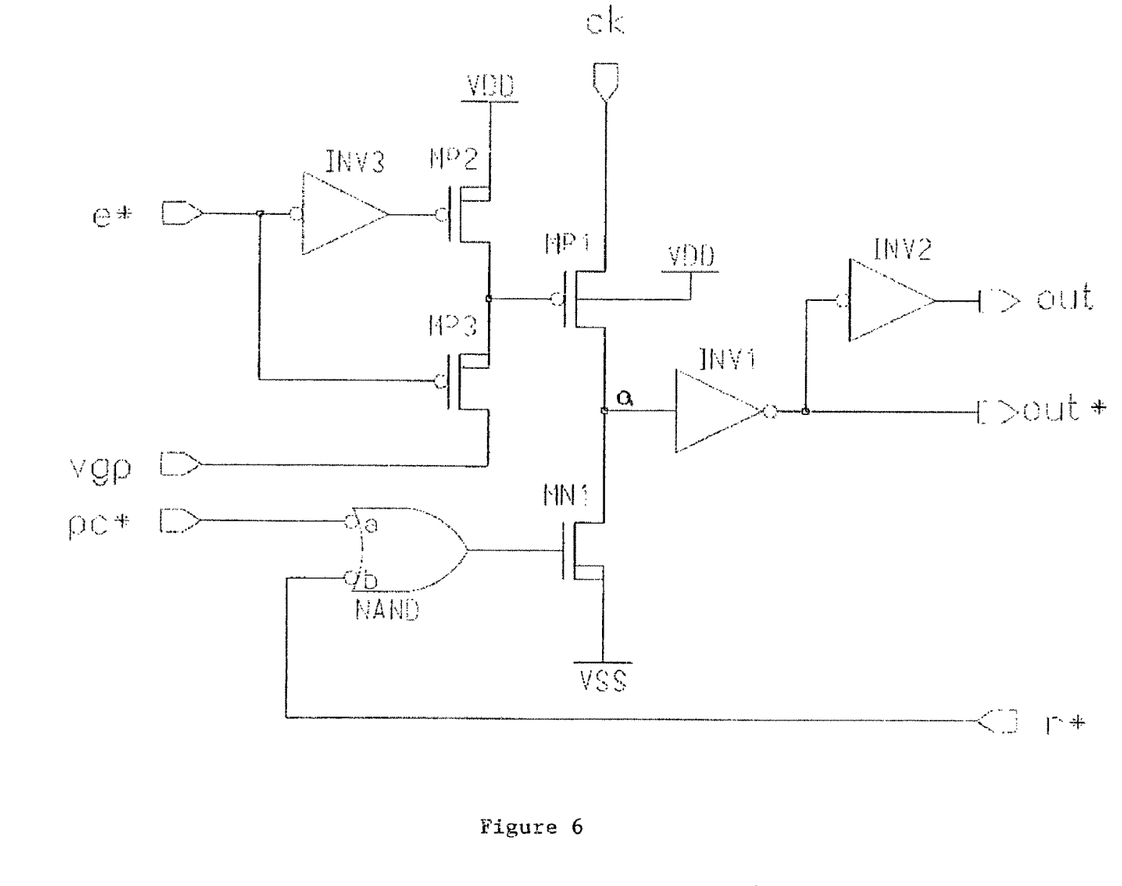
FIG. 6 is a circuit diagram of a low power shift register that can be used with the row heater.

One or both of the shift registers 64, 66 may be implemented using the approach described in a co-pending U.S. Provisional Patent Application No. 60/860,059, filed Nov. 20, 2006, entitled "Shift Register For Low Power Consumption," which is hereby incorporated by reference in its entirety. In particular, individual stages of the shift register operate with a low voltage swing clock signal, with the stage circuit having a single node driven directly by a single transistor. As shown in FIG. 6 (which corresponds to FIG. 3 of the referenced co-pending application) the clock ck drives a stage transistor MP1. The gate of MP1 is fed from a pair of cascode transistors MP2 and MP3 that set the state at node a as determined by inputs e* and vgp. The inverted input from the previous stage e* is fed to the input terminal of inverter INV3 to control the gate of transistor MP3. The MP3 drain terminal controls the gate of transistor MP1. The source terminal of transistor MP2 is fed from voltage VDD.

The pre-charge input pc* is fed through the single NAND gate together with a reset signal r*. The output of the NAND gate drives the gate terminal of signal buffer transistor MN1. The first inverter INV1 and second inverter INV2 provide, respectively, the inverted outputs out* and non-inverted output out.

In still other embodiments, the LCD array may, employ single crystal Thin Film Transistors (TFTs) to form the display elements 48, of the type described in co-pending U.S. Provisional Patent Application No. 60/838,014, filed Aug. 16, 2006, entitled "Display System With Single Crystal SI Thin Film Transistors," the entire teachings of which are hereby incorporated by reference.

Figure 7:
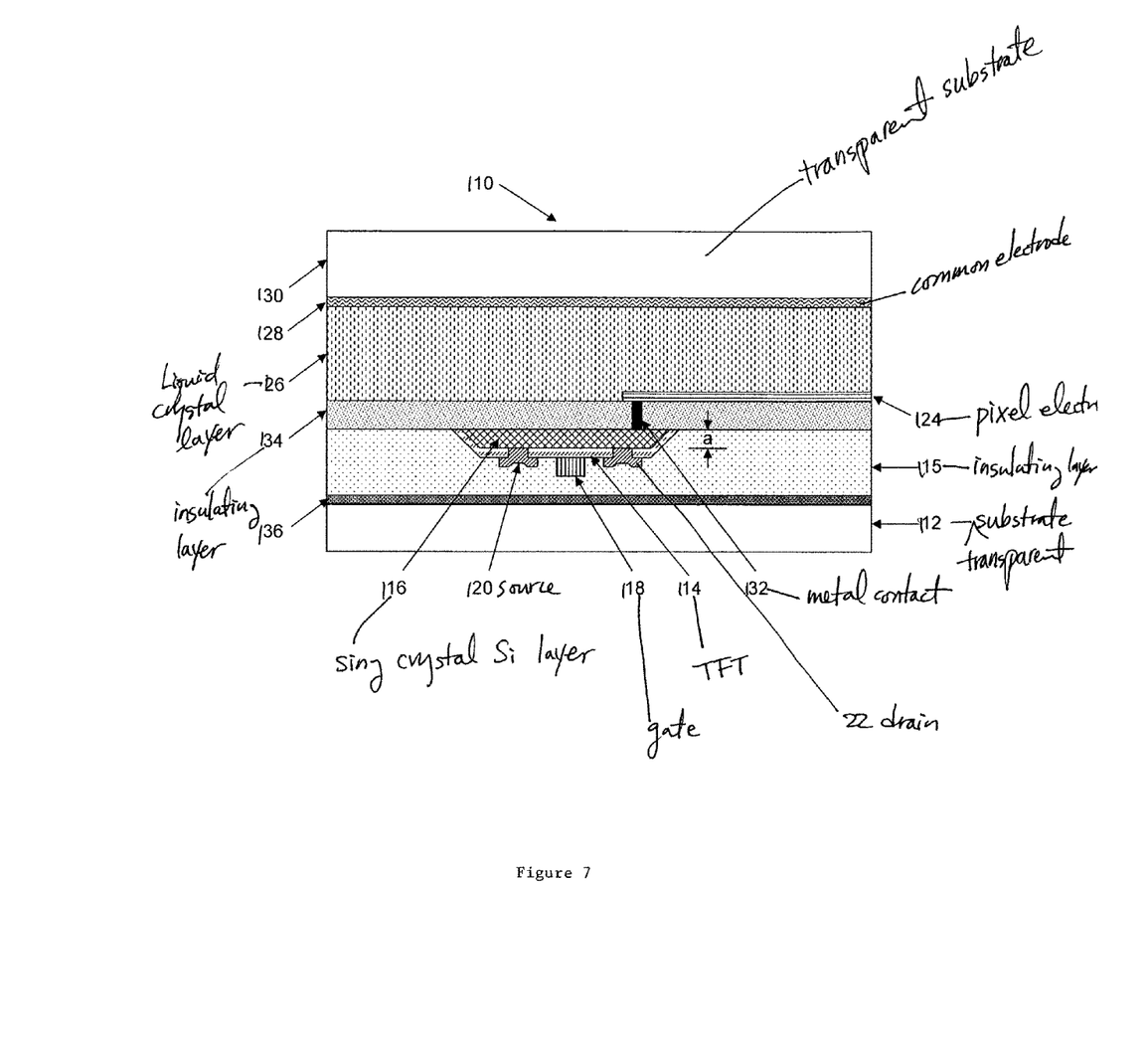
FIG. 7 is a cross sectional view of a liquid crystal display using Thin Film Transistors (TFTs) formed from a single crystal thin film, that can be used with the heater.

FIG. 7 is a schematic cross-sectional view of one embodiment of such a liquid crystal display 110 which includes a transparent substrate 112, such as glass, fused silica or sapphire. Over transparent substrate 112, single crystal Si TFTs 114 are positioned. Also shown are single crystal Si layer 116, gate 118, source 120 and drain 122. Single crystal Si TFTs 114 have a thickness in a range of between about 100 nm and about 200 nm, preferable in a range of between about 150 nm and about 200 nm. As used herein, the term "thickness of an array of single crystal Si thin-film transistor" means thickness "a" of single crystal layer 116, as shown in FIG. 7. Insulating material 115 is surrounding single crystal Si TFTs 114. Pixel electrodes 124 are positioned over single crystal Si TFTs 114. Liquid crystal layer 126 is positioned between common electrode 128 and pixel electrodes 124. Over common electrode 128 is positioned transparent substrate 130. Each single crystal Si TFT 114 and each pixel electrode 124 are in electrical communication with each other via metal contact 132. Insulating layer 134 is positioned around metal contact 132. In display 110, transparent substrate 112 and single crystal Si TFTs 114 are partitioned by bonding layer 136.

Figure 8:
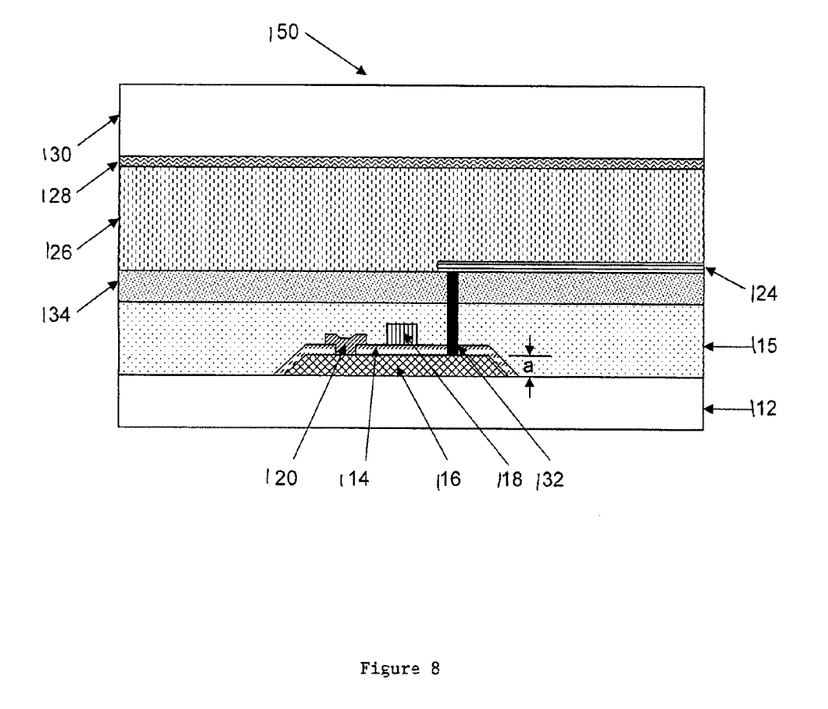
FIG. 8 is a cross sectional view of another single crystal film embodiment.

FIG. 8 is a schematic cross-sectional view of another embodiment of liquid crystal displays of the invention. The display 150 includes transparent substrate 112; and single crystal Si TFTs 114 over transparent substrate 112. Insulating material 115 is surrounding single crystal Si TFTs 114. Pixel electrodes 124 are positioned over single crystal Si TFTs 114. Liquid crystal layer 126 is positioned between common electrode 128 and pixel electrodes 124. Over common electrode 128 is positioned transparent substrate 130. Each single crystal Si TFT 114 and each pixel electrode 124 are in electrical communication with each other via metal contact 132. Insulating layer 115 is around metal contact 132. In display 150, single crystal Si TFTs 114 are partitioned on transparent substrate 112.

A display according to the present invention may be used in a variety of apparatus, including night vision devices, digital cameras, (Single Lens Reflectors (SLR) or video cams), handheld video games, and others.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus comprising:
   a two dimensional array of display elements disposed on a common semiconductor substrate, with each display element comprising at least a pixel, a transistor, and a storage capacitance,
   with each transistor having at least a gate, a drain, and a source terminal, and with each transistor arranged to control an operating state of the pixel, and wherein a first plate of the storage capacitance is connected to a drain terminal of the transistor;
   a plurality of row select lines distributed to control a first plurality of gate terminals;
   a plurality of column select lines distributed to control a second plurality of gate terminals;
   a common heating voltage line, the common heating voltage line electrically connected to and integral with two or more display elements at a point other than the gate terminal, and independent of both the row select and column select lines, and the common heating voltage line also connected to provide a second plate of the storage capacitance in each display element, the common heating voltage line also having two terminals to provide a first node and a second node; and
   a control circuit, for controlling voltages provided to both the first node and second node, such that a voltage difference between the first and second nodes causes current to flow through the common heating voltage line, and to thereby heat the display elements connected thereto, but also such that the common heating voltage line is applied to the storage capacitance independent of voltages applied to control the row and column select lines, so that heat is applied directly to the display element while the display element is actively operating to display information.

2. The apparatus as in claim 1 wherein a common heating voltage line is disposed adjacent to each of the transistor and pixel elements in each display element.

3. The apparatus as in claim 1 wherein the common voltage line is located in a plane beneath an active layer of the pixel elements.

4. The apparatus as in claim 1 wherein the display elements are used in one of a digital camera, digital Single Lens Reflex (SLR) camera, night vision display, handheld video game mobile telephone, or video eyewear device.

5. The apparatus as in claim 1 wherein at least one of the row select line or column select line is provided from a low power shift register.

6. The apparatus as in claim 1 wherein the display elements each further comprise a liquid crystal material layer, and the apparatus further comprises:

an active polysilicon layer disposed between the common voltage heating line and liquid crystal material layer.

7. The apparatus as in claim 5 wherein the low power shift register comprises a stage circuit having a single voltage node driven by a single transistor.

* * * * *